Feb 16, 1971  H. BERTRAM  3,563,717
METHOD OF PRODUCING HOLLOW GLASS BRICKS
Filed Jan. 8, 1968  2 Sheets-Sheet 1
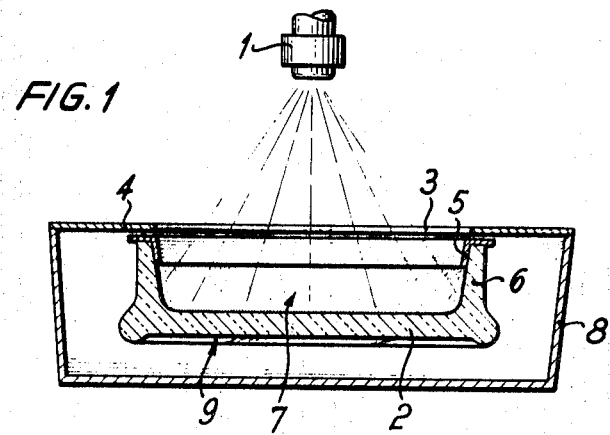
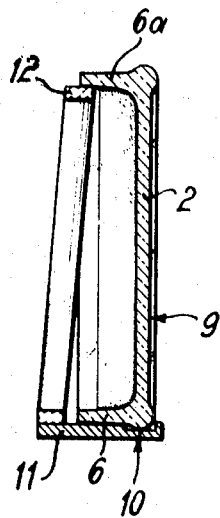
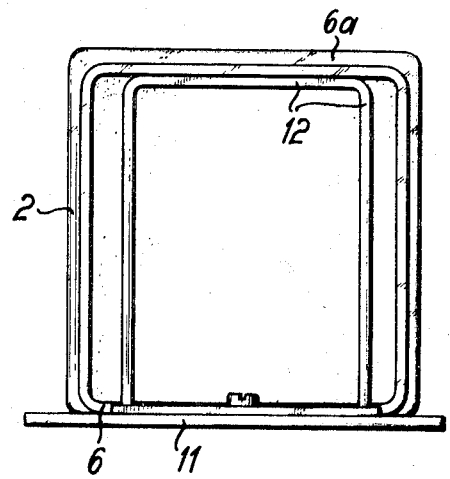
INVENTOR
HEINZ BERTRAM
ATTORNEYS

INVENTOR
HEINZ BERTRAM

ATTORNEYS

United States Patent Office 3,563,717
Patented Feb. 16, 1971

3,563,717
METHOD OF PRODUCING HOLLOW
GLASS BRICKS
Heinz Bertram, Sindorf, Cologne, Germany, assignor to Compagnie de Saint-Gobain, Neuilly-sur-Seine, France, a company of France
Filed Jan. 8, 1968, Ser. No. 696,267
Int. Cl. C03b 23/24
U.S. Cl. 65—58                                     12 Claims

ABSTRACT OF THE DISCLOSURE

A method for producing hollow glass bricks with an enamel coating. The method comprises the application of the enamel to the inner surface of half bricks while they are maintained at room temperature, heating of the half bricks to above their upper glass transformation temperature but below their liquifying temperature while the half bricks are resting on one of their narrow sides, and then welding the two half bricks together along edges to form a colored transparent whole glass brick.

---

The present invention relates to methods for the production of hollow colored glass bricks in which two glass brick halves of which at least one has a transparent enamel coating are welded together using gas burners or other devices.

One prior art method of producing glass bricks is to apply the enamel coating to the outer surface of the brick. However, it has been found that with this method there is the disadvantage that most known transparent color coatings which can be used for this purpose are insufficiently resistant to atmospheric attack and to scratching and friction. The more stable enamels have a higher fusing temperature which has made them appear unsuitable for the production of hollow colored glass bricks.

The enamels appearing useful are therefore those with a comparatively low fusing point, for example enamels based upon borates whose chemical stability and resistance to friction are comparatively great. The melting temperature of these enamels is however still so high that the problem arises of holding or positioning the bricks during the fusing-on of the enamel since deformation of the bricks and damage of the outer enamel layer must be avoided.

There is naturally also the possibility of applying the enamel layer to the inner surface of the glass brick halves instead of to the outer, that is to say before the welding of two glass brick halves together. In practice, however, it is difficult to produce colored glass brick halves and to weld them satisfactorily.

Experience has shown that it is not possible to apply enamel powder to the hot hollow brick halves immediately after leaving the press. If it is desired to obtain with certainty a uniform coating of enamel, it is necessary to apply the enamel powder at room temperature, or at least in the neighborhood of room temperature.

As a result, the cooled glass hollow brick halves must be heated before welding to a sufficient temperature to ensure, on the one hand, that the enamel powder can melt and form an even coating and, on the other hand, the application of the welding temperature does not cause thermal stresses which cause the glass to crack. Reheating must for this reason be above the upper transformation temperature of the glass. In practice it has been found that a reheating temperature of from 5–20° C. over the transformation temperature is satisfactory, this temperature being maintained for about fifteen minutes before welding together of the brick halves.

Although welding by this method of the production of welded hollow bricks is carried out while the glass brick halves are at a temperature of 5–20° C. above the transformation temperature, no damage to the outer surface of the glass brick halves occurs when they are rested on their largest surface. This is due to the fact that in the practice of this method the brick halves are cooled from their pressing temperature so as to be at their lower welding temperature. Under these circumstances the outer faces of the glass brick halves which cool first naturally have a lower temperature than the interior of the brick. The bricks are therefore, for practical purposes, solidified and cannot be seriously damaged by contact with their outer faces.

This method of welding following cooling from the higher pressing temperature cannot be practiced once the brick halves are cooled to room temperature for coating with the enamel slip and are then heated to the fusing temperature of the enamel.

It has, in fact, been found that reheating by use of an external source of heat necessarily results in those parts of the glass brick halves on which the later rest being brought to a temperature at which these parts are deformed by contact with the surface on which they rest while the inner temperature of the glass body remains lower.

One object of the present invention is to avoid these disadvantages.

In accordance with the invention, the enamel is applied to the inner surface of a glass brick half at room temperature, and the half is then heated to a temperature above the transformation temperature of the glass, the half being so supported in this heating that its main surface is upright. In this manner the main surface of the glass brick remains out of contact with any rigid supporting surface which will cause damage. The lateral surfaces of the glass brick halves, which in certain cases may undergo a slight deformation in places, due to resting upon the solid support surface, are, in any case, so arranged in laying the bricks to form a building structure that any such deformations remain invisible or do not present an unattractive appearance.

In the case of glass brick halves of small dimensions it is generally sufficient to place the bricks upright, the bricks being supported, for example, along a lateral arris of the main face and on the arris at the other side of an adjacent side wall, the opposite, upper side wall being itself supported from below by a heat-resistant frame, for example of metal.

The main face of the brick half can then be slightly inclined, this not being disadvantageous in practicing the method of the invention.

On the other hand if the brick halves are large, it has been found necessary to support them in such a manner that the main face is substantially vertical.

In putting into practice the present invention, it has been found that in welding the brick halves, the layer of enamel can be damaged at the welding joint by decomposition of the enamel due to the excessively high temperature which causes thermal dissociation of the metal oxides forming the enamel so that the oxides are reduced to metal. This makes the appearance of the finished welded brick unattractive and its commercial value is correspondingly reduced.

In order to avoid this disadvantage, it has been found necessary, and this constitutes a particular feature of the present invention, to apply and fuse the colored enamel on the interior surface of the half bricks in such a manner that the regions adjacent to the areas of welding are kept free of enamel and the welding burners are manipulated in such a manner that the welding flame cannot extend beyond the interior edge of the flange parts to be welded. This avoids damage to the enamel coating.

The method of the invention will now be described in more detail of reference to the attached drawing.

FIG. 1 shows, in section, the application of enamel before fusing.

FIG. 2 shows, in section, a half brick and its support in accordance with the invention during reheating to the temperature necessary for the fusing of the enamel and welding.

FIG. 3 is a view from the front of what is shown in FIG. 2.

Figure 4:
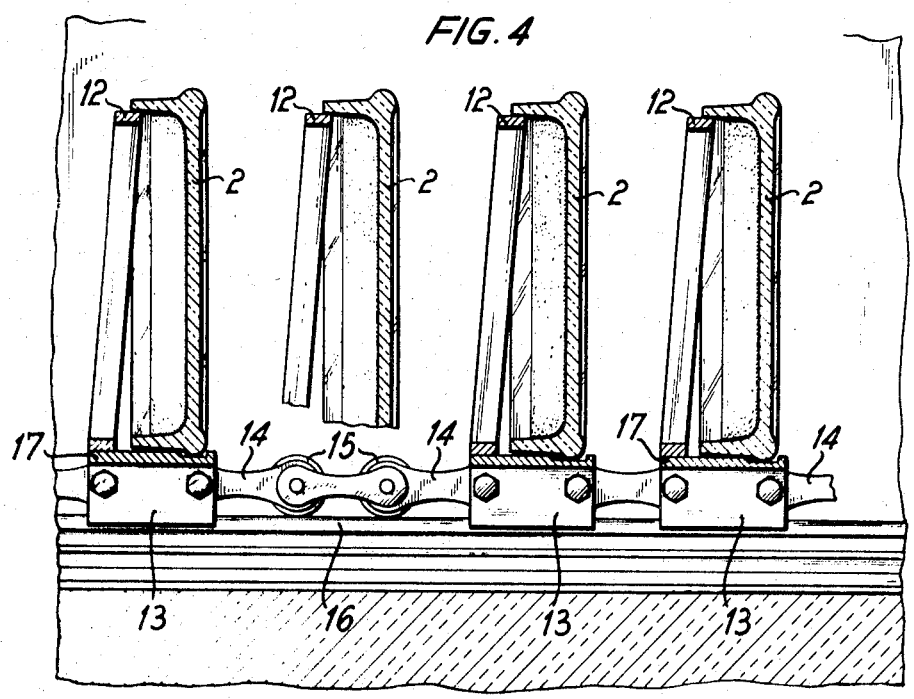
FIG. 4 is a view of part of an installation for continuous thermal treatment of half bricks.
Figure 5:
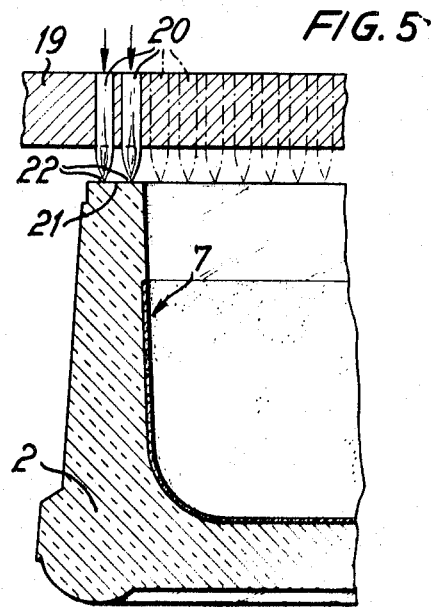
FIG. 5 shows part of a half brick and welding burners in action.

In order to obtain an even layer of enamel powder, the latter is mixed with water to make a slip, preferably using about 100 parts of powder by weight to 40 parts of water. The slip is then sprayed by means of a spray gun onto the interior face of the half brick. As can be seen from FIG. 1, the application of the enamel is carried out using a gun 1 projecting the slip on the internal surface of a half brick 2 through an opening 3 in a mask 4 which prevents enamel being sprayed onto the outer parts of the half brick. Moreover, in order to avoid enamel being deposited on the marginal zones adjacent to the eventual site of welding, I provide a ring 5 of angular cross section which is placed between the mask 4 and the lateral walls 6 of the half brick. It can be seen that in these conditions the deposit of enamel is limited to the portion 7 of the internal surface of the half brick, especially if the half brick is enclosed, for example, in an air-tight box 8, the cover of which forms the mask 4.

To ensure uniformity of the layer of enamel, the half brick can be illuminated on its main face 9 so that the transparency of the layer of enamel can be examined and any possible irregularity in thickness discovered.

In practice it has been found that conventional transparent enamels having fusing temperatures of 540–560° C. give good results.

After low-temperature drying of the enamel layer, the half brick is placed upright on edge on a support as shown in FIG. 2. The half brick 2 rests on its lower arris or edge 10 of the main face and is also supported by the lateral wall 6 which rests on a rigid support 11 of suitable shape.

On the other hand, the free edge portion of the lateral wall 6a placed uppermost is supported by a rectangular metal frame 12 which is resistant to heat.

FIG. 3 shows the face of the support 11 on which both the lower lateral wall of the half brick and the frame 12 rest for supporting a greater part of the lateral wall 6a at the top.

The main face 9 of the half brick is substantially vertical without being close to any support and the horizontal lateral walls are supported in such a manner that no appreciable deformation can occur.

During reheating of the half brick supported in this manner to the necessary temperature of approximately 550° C., maintained for a period of approximately 15 minutes, the enamel melts and forms a uniform homogeneous coating, and it has been found, surprisingly, that despite the vertical position of the enameled surface, the enamel layer does not have any irregularity in color, providing the slip has been applied evenly and sufficiently thinly.

FIG. 4 is a view of part of an installation intended for the continuous practice of the method or process in accordance with the invention. The installation comprises supports 13 connected together by chain links 14 forming an endless chain. The supports 13 are mounted on rollers 15 passing through a kiln or furnace on parallel rails in the furnace.

Each support 13 has an upper plate 17 shaped to the cross section of the support 11 shown in FIG. 2 and supporting the metal frame 12. This frame 12 can be so attached to the plate 17 that it can easily be removed and replaced in accordance with changes in the size of half bricks to be treated.

Each support 13 conveniently has a sufficient length in a direction perpendicular to the plane of the FIG. 4 to support, side by side, several half bricks and several frames 12.

The endless chain conveyor runs through the furnace or kiln at a speed determined by the conditions of heating to be maintained and the welding apparatus is situated at the outlet of the furnace. It is not shown in the drawing.

At the welding position each glass brick half is allowed to cool slightly superficially and placed in a horizontal position. The cooling ensuring that the skin or the half brick is sufficiently rigid. The half bricks are then moved up to a welding burner 19. In the working position the burner nozzles 20 must be precisely opposite the edge parts 21 to be welded together so that the flame tips 22 only contact the edges themselves. Moreover, the flames must be adjusted so as to be oxidizing and should not have a flame length of more than about 6 mm. The best results are obtained with a very short flame of about 4 mm. If these conditions are adhered to, damage to the enamel layer is avoided.

When the second glass brick half of a pair has been heated to a fused condition on those of its edges to form the weld, the two brick halves are pressed together with a slight pressure.

The method in accordance with the invention can be so carried out that both of the two glass brick halves to be welded together are provided with an enamel layer. It is however also possible to provide only one of the halves with an enamel layer, the other brick in the pair being colorless.

The embodiments of the invention in which an exclusive property or privilege is claimed are defined as follows.

1. In a method of producing hollow glass bricks by producing glass half bricks having an inner surface and then joining the half bricks together in pairs to make whole bricks, the improvement for making generally transparent colored glass bricks in which the following steps are carried out: applying colored enamel at room temperature to the inner surface of at least one such half brick of a pair to be joined together to form a whole brick while maintaining said half brick at room temperature; after such application of enamel heating the half brick to above its upper glass transformation temperature but below its liquifying temperature while in an upright position to fuse the enamel and form a generally transparent colored coating therefrom; and then welding the half brick having such coating to another half brick of glass to form a colored transparent whole glass brick.

2. The method as set forth in claim 1 in which the enamel layer is applied to the inner surface of the glass half brick so as to leave free of enamel the marginal part of a side wall of the brick, and in which burner nozzles are used for welding said half bricks by angling such nozzles and limiting the length of the welding flame so that the flame is restricted to an area free of the enamel previously applied.

3. The method as set forth in claim 2, including using a spray gun to apply said enamel and using a ring of angular radial section to limit the area to which the enamel is applied.

4. The method as set forth in claim 1, including the step of supporting the half brick in an upright position on a conveyor belt during heating to fuse the enamel, by resting such half brick on an arris of its main face and on an adjacent side wall thereof.

5. The method as set forth in claim 4, including the step of additionally supporting the glass brick during heating by using a metal frame which supports the under-surface of an upper side wall of the half brick opposite the side wall mentioned in claim 4.

6. A method of producing colored hollow glass bricks from a pair of half bricks having an inner surface, comprising the steps: applying colored enamel to the inner surface of at least one of said brick halves while the brick half is maintained at room temperature; placing the enameled half brick with its surface to be exposed while in use in a vertical position while supporting it from one of the sides which will be concealed while in use; heating the half brick while so supported to above the upper glass transformation temperature but below its liquifying temperature to fuse the enamel to the half brick; and welding the half brick to another half brick to form a complete whole brick.

7. The method of producing hollow glass bricks described in claim 6, including the additional step of supporting the upper free edge of the half brick while it is being heated in a vertical position.

8. The method of producing hollow glass bricks described in claim 6, including the additional step of maintaining free of said enamel an area adjacent edges of said brick half to be welded to the other half brick.

9. The method of producing hollow glass bricks described in claim 8, including the additional steps, after fusing of the enamel, of cooling the vertical surface of the enameled brick half to a temperature just below that at which it will be deformed by contact with another surface, resting the brick half on the cooled surface; heating edges of the brick half to welding temperature while restricting the area of direct heat contact to that portion of the brick half free from enamel, 10. The method of producing hollow glass bricks described in claim 9, wherein the heating of the edges for welding is done by a flame of 4 mm. to 6 mm. in length.

11. The method of producing hollow glass bricks described in claim 6, wherein the heating is in the range of 5°–20° C. above said transformation temperature for a period of approximately fifteen minutes.

12. A method of producing hollow colored glass bricks from a pair of half bricks having an inner surface, comprising the steps: applying colored enamel to the inner surface of at least one of said brick halves while the brick half is at room temperature; placing the half brick with its surface to be exposed while in use in a vertical orientation while supporting it on an arris of said surface and an adjacent side wall; heating the half brick while so supported to above the upper glass transformation temperature but below its liquifying temperature to fuse the enamel to the half brick; and welding the half brick to another half brick to form a complete whole brick.

References Cited
UNITED STATES PATENTS

| | | | |
|---|---|---|---|
| 2,946,697 | 7/1960 | Petro | 117—124A |
| 3,096,684 | 7/1963 | Kegg | 65—60 |
| 3,455,722 | 7/1969 | Kushihashi | 65—30 |

HOWARD R. CAINE, Primary Examiner

S. R. FRIEDMAN, Assistant Examiner

U.S. Cl. X.R.

65—60